D. A. CARMICHAEL.
WATER MOTOR.
APPLICATION FILED MAY 16, 1921.

1,429,842.

Patented Sept. 19, 1922.
5 SHEETS—SHEET 1.

D. A. Carmichael INVENTOR

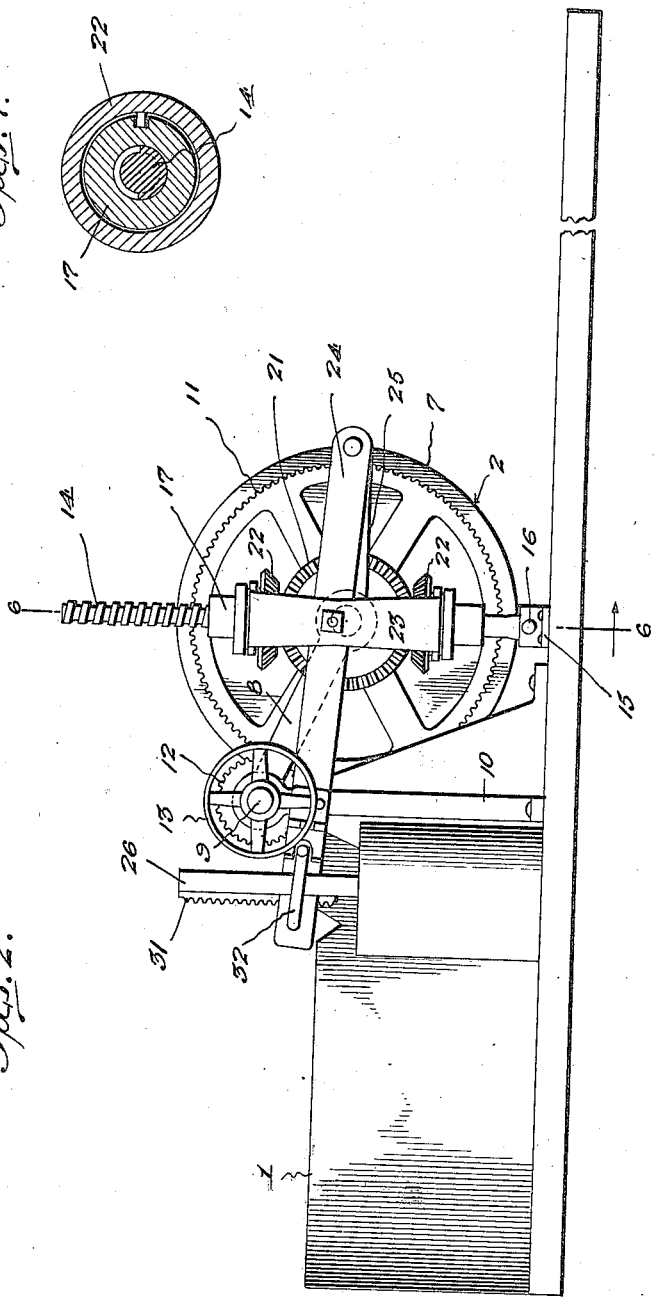

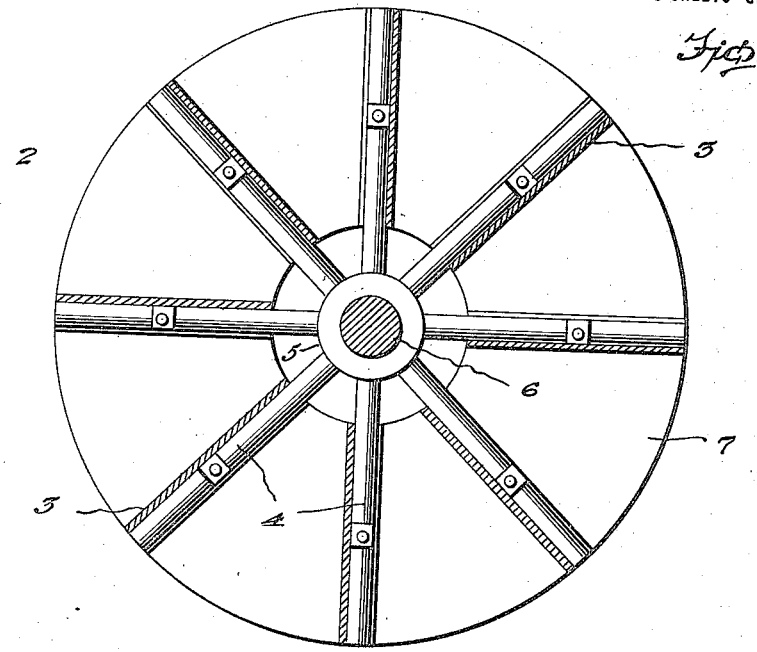
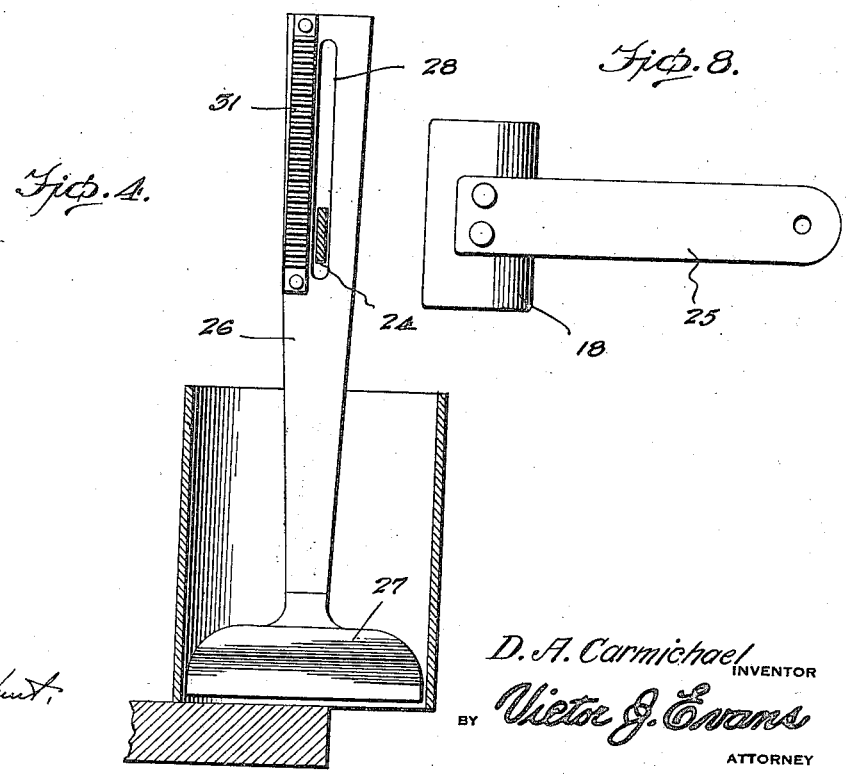

D. A. CARMICHAEL.
WATER MOTOR.
APPLICATION FILED MAY 16, 1921.
1,429,842.
Patented Sept. 19, 1922.
5 SHEETS—SHEET 4.
Fig. 5.
Fig. 6.
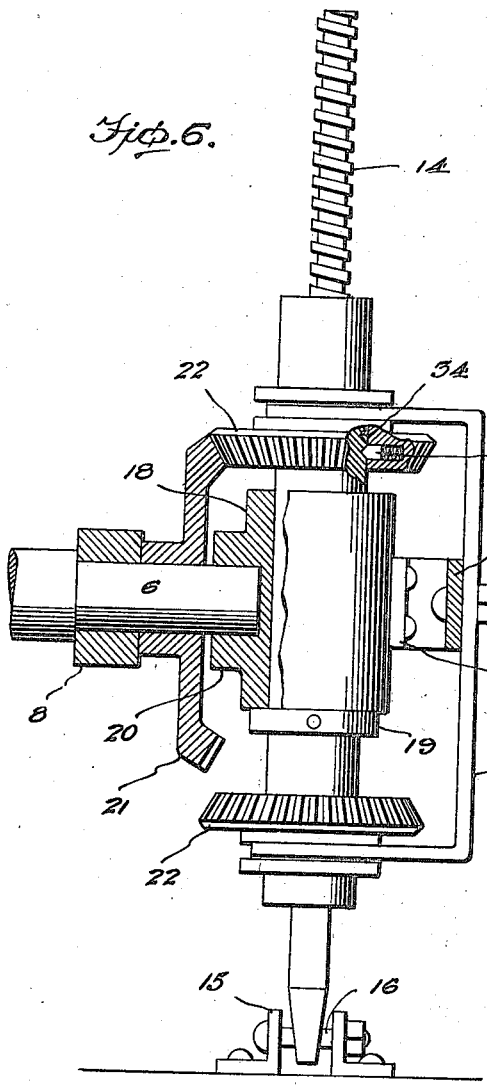
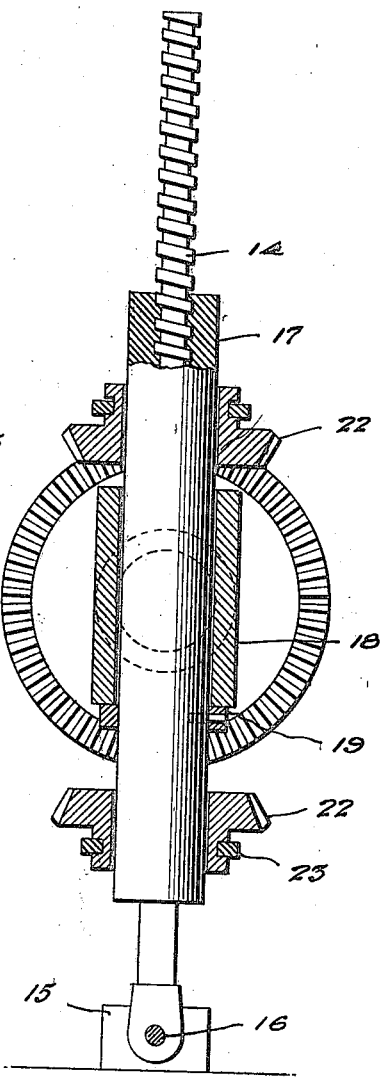

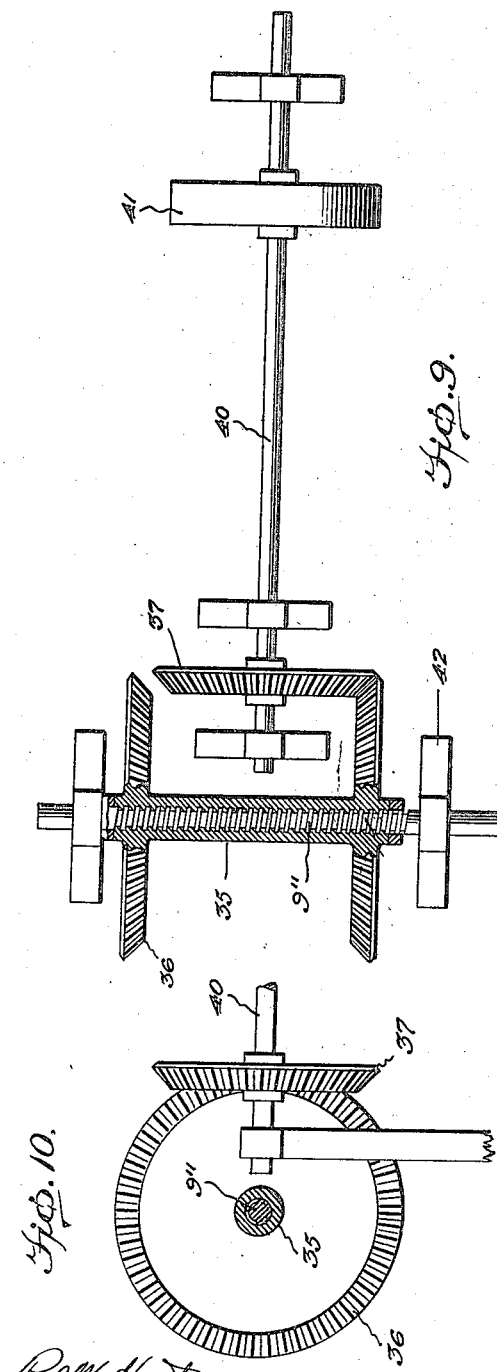
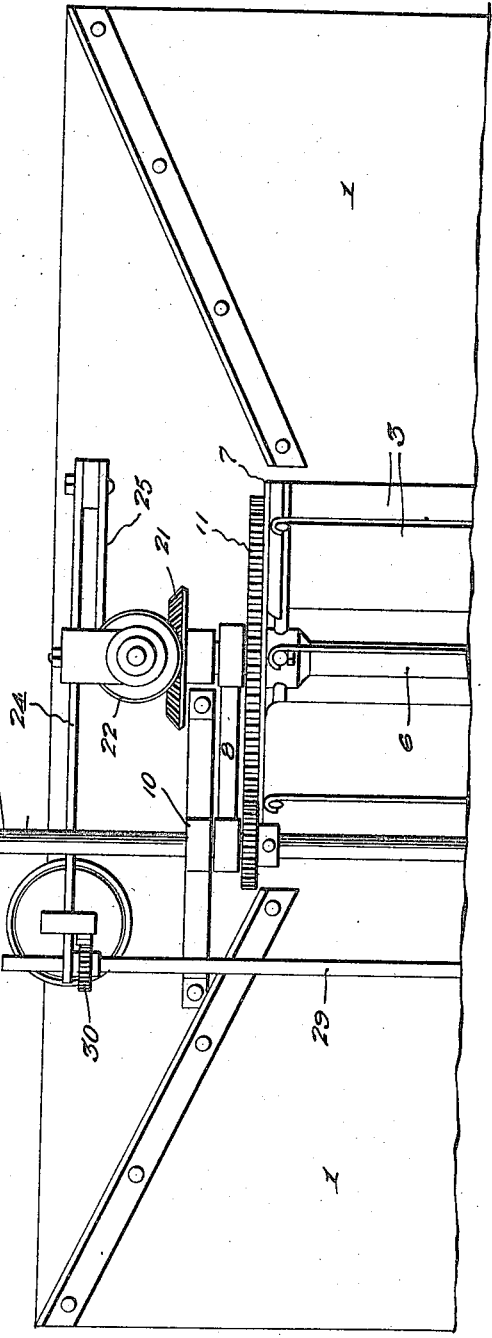

Patented Sept. 19, 1922.

1,429,842

UNITED STATES PATENT OFFICE.

DREWEY A. CARMICHAEL, OF AMERICUS, GEORGIA.

WATER MOTOR.

Application filed May 16, 1921. Serial No. 470,088.

*To all whom it may concern:*

Be it known that I, DREWEY A. CARMICHAEL, a citizen of the United States, residing at Americus, in the county of Sumter and State of Georgia, have invented new and useful Improvements in Water Motors, of which the following is a specification.

This invention relates to improvements in water motors, the general object of the invention being to provide a motor which will be driven from any stream of moving water or by the tides, with means for transmitting the movement of the motor to the element to be driven.

Another object of the invention is to provide a channel so formed that it will direct a large amount of water against the motor to actuate the same.

A still further object of the invention is to provide means for automatically moving the motor by the rise and fall of the stream of water so as to keep the wheel in a certain relation to the surface of the water.

Another object of the invention is to provide means for moving the wheel out of the water whenever necessary or desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a side view.

Figure 3 is a section on line 3—3 of Figure 1.

Figure 4 is a section on line 4—4 of Figure 1.

Figure 5 is a section on line 5—5 of Figure 1.

Figure 6 is a section on line 6—6 of Figure 2.

Figures 7 and 8 are detail views.

Figure 9 is a partial plan view with parts in section showing the invention designed as a tide motor.

Figure 10 is a detail view of this motor.

Figure 1:
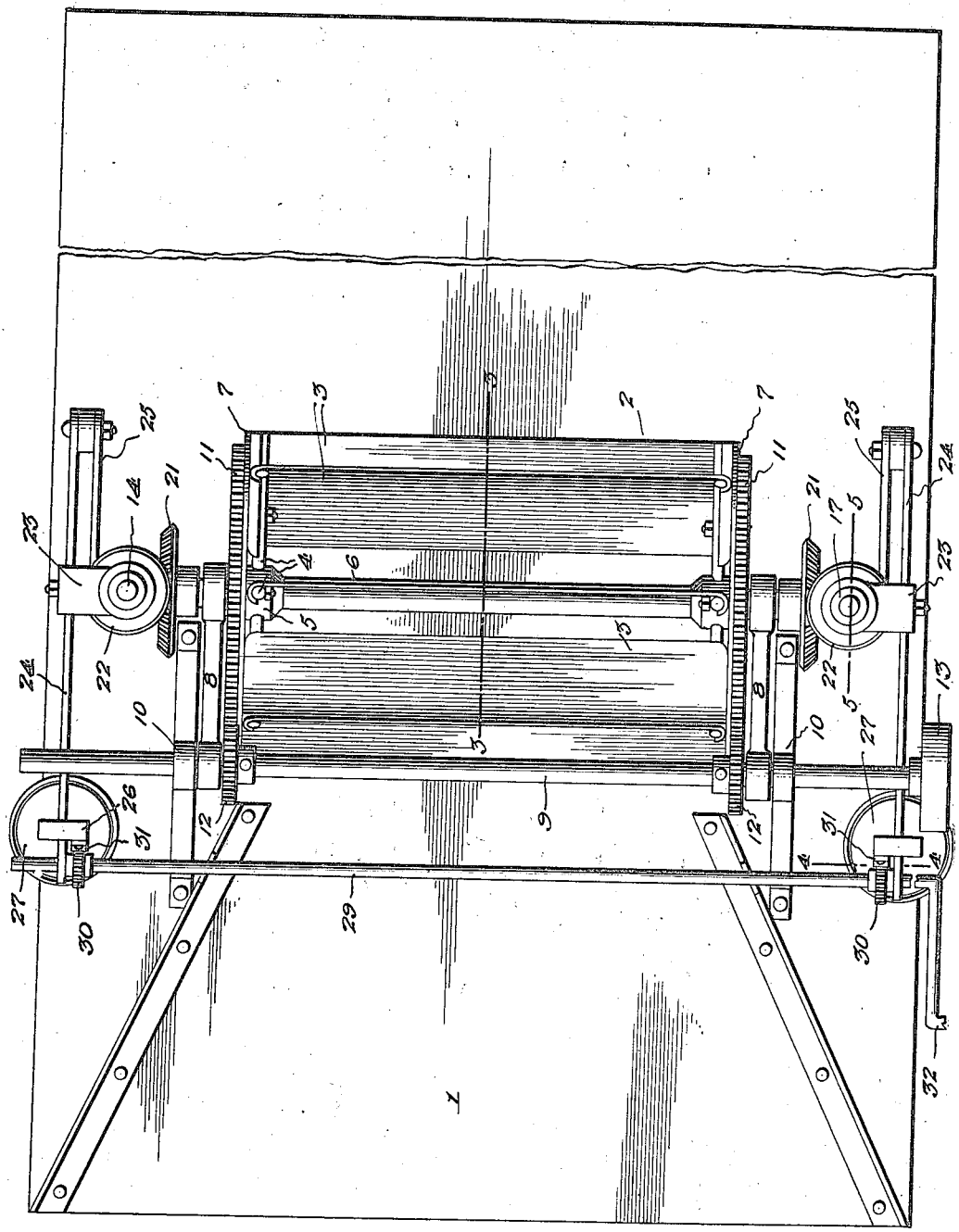
Figure 1 is a plan view of the invention.

In these views 1 indicates a channel which may be constructed of any suitable material and in any desired place in a stream or body of water, the entrance end of the channel flaring outwardly so as to direct a relatively large amount of the water into the narrow part of the channel to increase the flow of water through this narrow part.

The water wheel 2 is located in this narrow part of the channel and said wheel consists of the blades 3 which are carried by the spokes 4, radiating from the hub 5 on the axle 6. The ends of the wheel are closed, as at 7. The wheel is of slightly less length than the narrow part of the channel so that practically all of the water will engage the wheel, this water being confined by the closed ends of the wheel. The axle 6 is journaled in the outer ends of the arms 8 and these arms are pivotally secured to a shaft 9 which is journaled in stationary supports 10. Large gears 11 are secured to the ends of the wheel and these gears mesh with gears 12 on shaft 9, these parts being so arranged that the wheel can be moved around shaft 9, due to its connection therewith by the arms 8, without the gears coming out of mesh. The rotation of the wheel by the water will be communicated to shaft 9 through said gears and this movement of shaft 9 can be communicated to the element to be driven in any suitable way, such as by belting engaging the pulley 13 on said shaft.

A screw shaft 14 is located adjacent each end of the wheel, the shaft having its lower end hingedly connected to a stationary part 15, as shown at 16. An elongated nut 17 engages each shaft and axle 6 is connected with each nut by means of the sleeve 18 which is rotatably held on the nut by the collars 19 and which is provided with a socket 20 for receiving the end of the axle. A beveled gear 21 is placed on each end of the axle and a pair of gears 22 is slidably carried by each nut, said gears 22 being held against rotation on the nut. These gears are connected together by the yoke member 23, said member being carried by a lever 24 which has one end pivotally secured to an arm 25, carried by the sleeve and its other end connected with a post 26 which is secured to the float 27. Thus as the float rises and falls with the water level the lever 24 will be shifted to move the yoke member to engage and disengage the gears 22 with the gear 21 and when one of these gears 22 is in mesh with gear 21 the rotation of the wheel will be communicated to the nut so as to move said nut on the screw shaft and thus raise or lower the wheel.

In order to provide means for regulating the movement of the wheel by the floats I adjustably connect the levers with the post. Such means comprises the slot 28 in each post through which the end of the lever passes, a shaft 29 passing through the said levers and having the gear wheels 30 thereon which engage the racks 31 on the posts. One end of shaft 29 is provided with a handle 32.

It will thus be seen that by rotating the shaft 29 by its handle the post and levers will have their points of connections shifted so that the raising and lowering of the water wheel by the floats will be controlled. This arrangement of parts can also be used for raising the water wheel entirely out of water so that it will come to rest and the apparatus rendered inactive.

I also provide means for preventing grinding of the gears 21 and 22, such means consisting of a spring plunger 33 in each gear 22 which engages with V-shaped recesses 34 in the nut, the spring plunger having a beveled end. By this arrangement when the gear 22 is moved the plunger will be pressed inwardly against the action of the spring until its pointed end reaches the top of the recess when its spring will force it into the recess and thus snap the gear into engagement with the gear 21.

I may also provide means whereby the motor can be actuated by the tides. In this case the channel would be made so as to direct the water against the wheel at both the ebb and flow tides, as shown in Figure 9. The shaft 9' is provided with an extension having a screw threaded portion 9" thereon with which engages the interiorly screw threaded sleeve 35. Said sleeve has a beveled gear 36 at each end thereof, either one of which is adapted to mesh with a bevel gear 37 on shaft 40 to which the pulley 41 is secured. The sleeve is arranged between the supports 42 which limit the longitudinal movement thereof.

It will thus be seen that when the tide changes and the water wheel is caused to revolve in an opposite direction, the initial rotation of shaft 9' will cause the sleeve to move longitudinally, by a screw threaded connection with the shaft, so as to move one beveled gear out of mesh with the gear 37 and place the other gear 36 in mesh with the gear 37. By this arrangement of parts the pulley shaft 40 will be rotated in the same direction no matter in which direction the water wheel is revolving.

I may also place the two screw shafts on floats which are sufficiently strong to support the weight of the wheel and its attached parts. This arrangement of parts will keep the wheel at the same depth in the water at all times regardless of the rise and fall of the stream. The nut arrangement could be used in this case for raising the wheel out of the water to stop it.

From the above it will be apparent that my device can be used on comparatively small streams as the channel, constructed as shown, will direct a body of water of considerable size against the wheel so as to rotate it. This movement of the wheel will be communicated to the driven shaft by means of the gearing, such means permitting the wheel to be raised and lowered by the water in the stream without the gears coming out of mesh. The wheel is kept at a constant depth relative to the water surface even though the level of water decreases or increases, as the floats and their connections with the wheel will provide for this.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a supporting structure, a shaft rotatably mounted therein, a wheel, arms for swingingly connecting the water wheel with the shaft, gearing connecting the water wheel with the shaft, vertical screw shafts hingedly connected at their lower ends to the supporting structure, nuts on said shafts, means for connecting the nuts with the wheel and means for rotating the nut by the movement of the wheel when desired.

2. An apparatus of the class described comprising a supporting structure, a shaft rotatably mounted therein, a water wheel, arms for swingingly connecting said water wheel with the shaft, gearing connecting the water wheel with the shaft, a vertical screw shaft hingedly supported at its lower end to the supporting structure, a nut on said screw shaft, means for connecting the nut with the axle of the water wheel, a gear on said axle, upper and lower gears on the nut, a float and means for moving the upper and lower gears into and out of mesh with the gear on the axle by the movement of the float.

3. An apparatus of the class described comprising a supporting structure, a shaft rotatably mounted therein, a water wheel, arms for swingingly connecting said water wheel with the shaft, gearing connecting the water wheel with the shaft, a vertical screw shaft hingedly supported at its lower end to the supporting structure, a nut on said screw shaft, means for connecting the nut with the axle of the water wheel, a gear on said axle, upper and lower gears on the nut, a float and means for moving the upper and lower gears into and out of mesh with the gear on the axle by the movement of the float, such means including adjustable means for adjusting the movement of the wheel by said float.

In testimony whereof I affix my signature.

DREWEY A. CARMICHAEL.